March 21, 1967 K. GÜHRING 3,309,819
MACHINE TOOL
Filed May 26, 1964 4 Sheets-Sheet 1
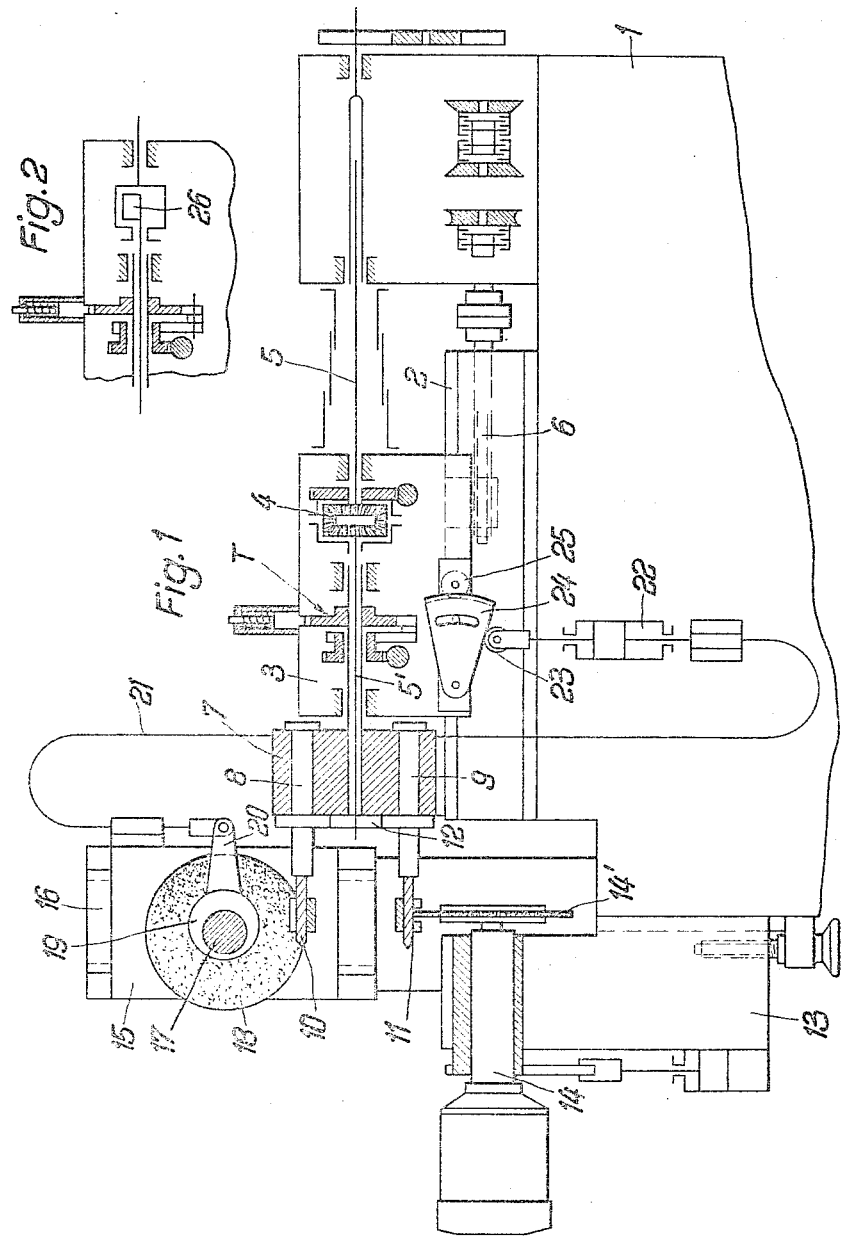
Inventor:
KNUT GÜHRING

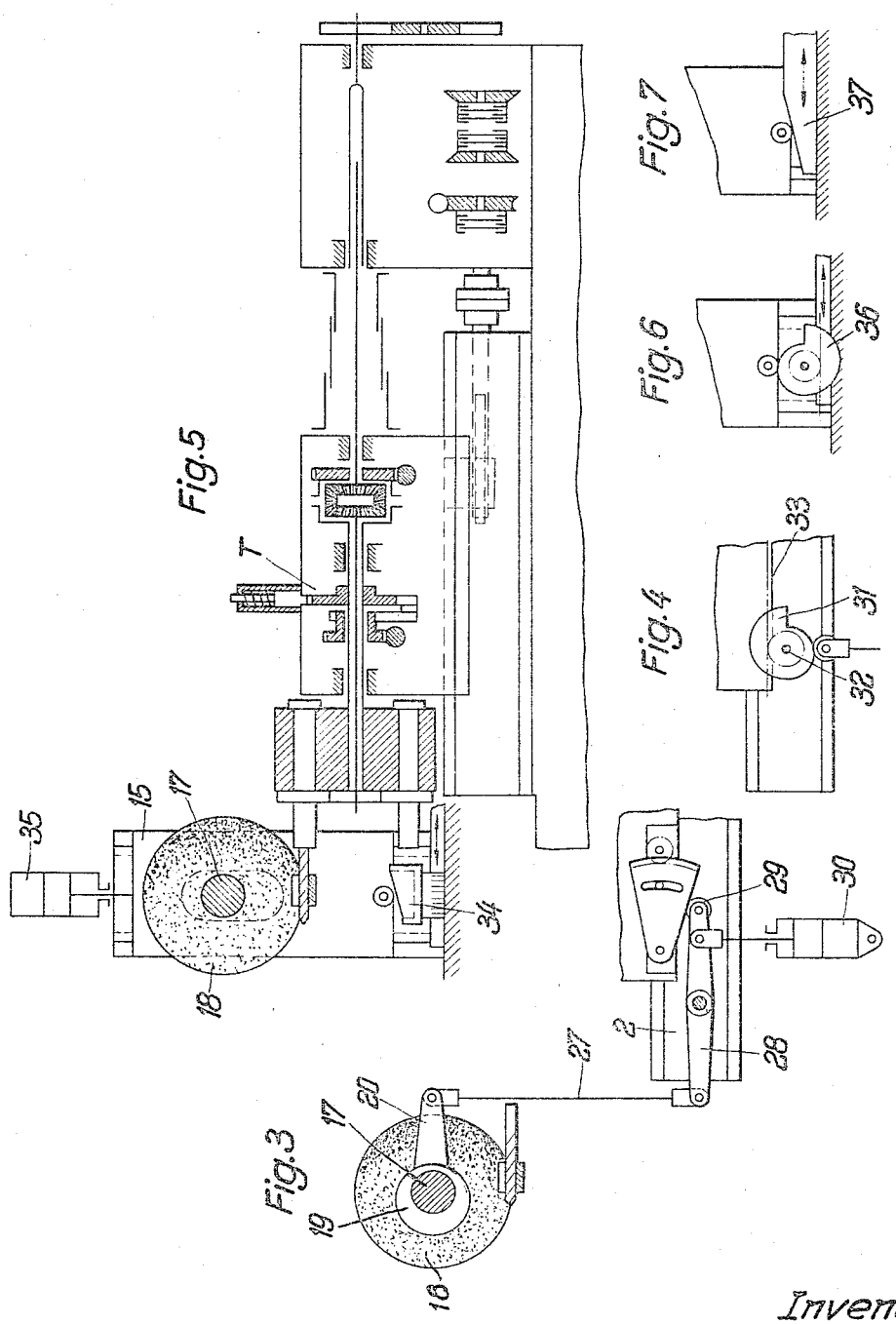

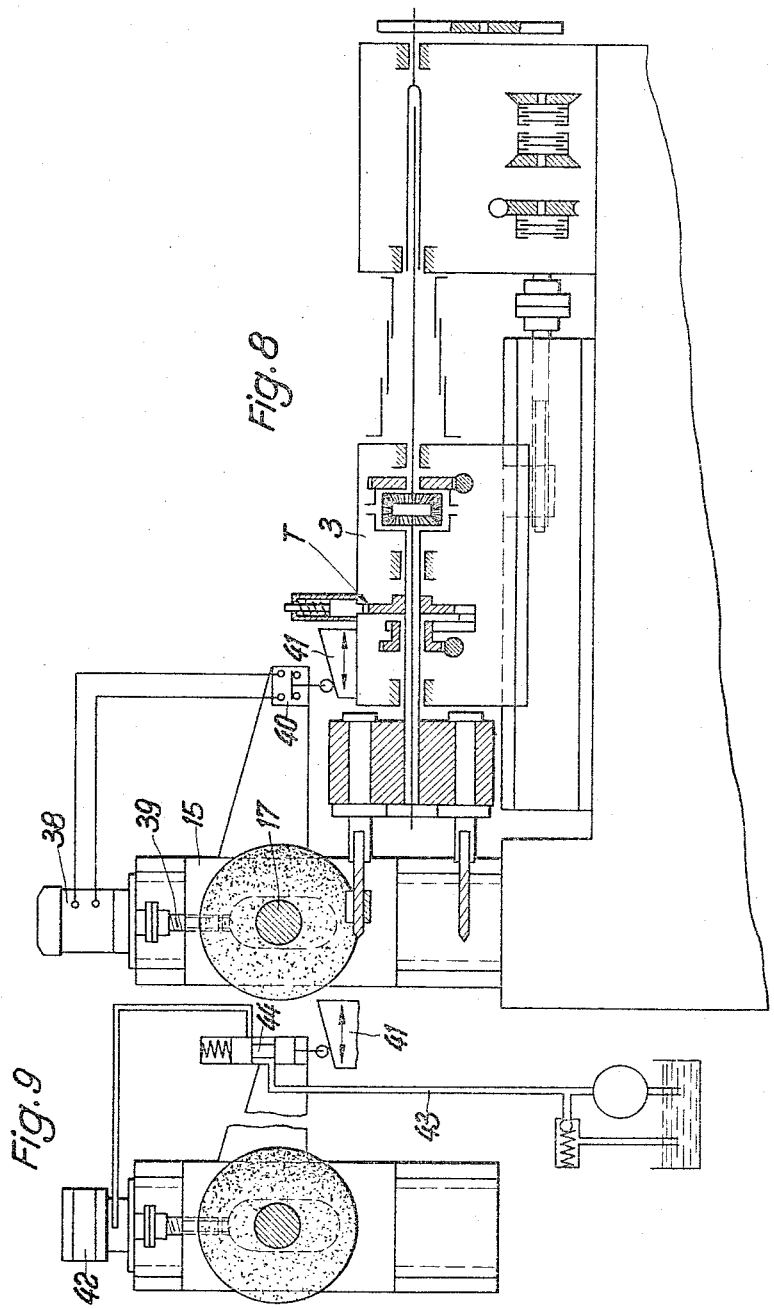

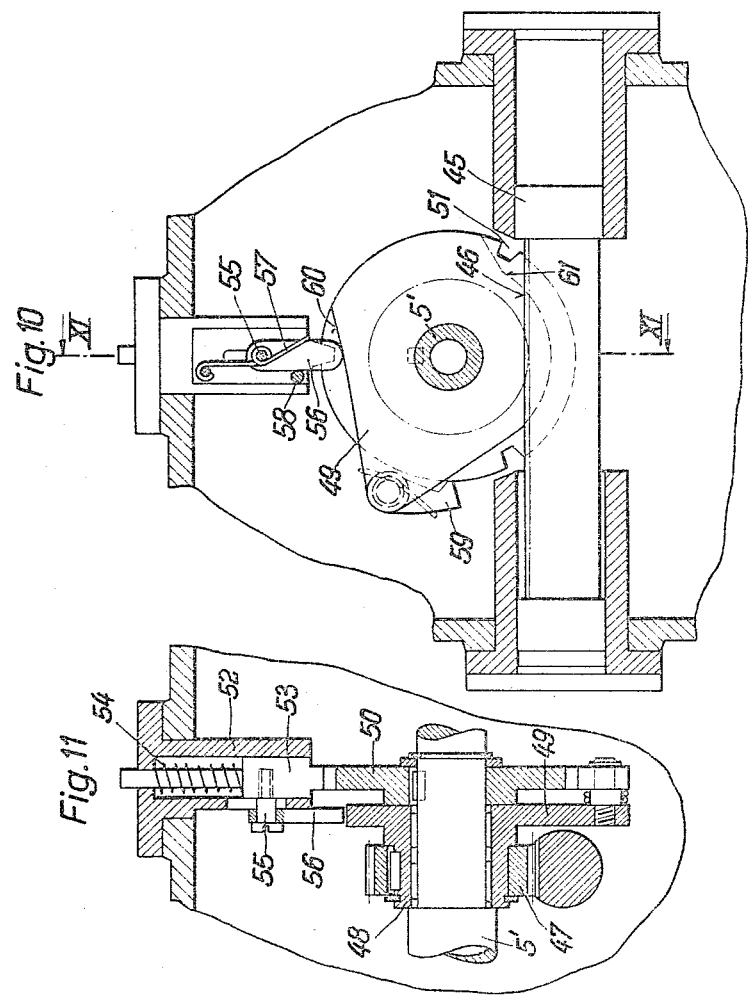

United States Patent Office 3,309,819
Patented Mar. 21, 1967

3,309,819
MACHINE TOOL
Knut Gühring, Ebingen, Wurttemberg, Germany, assignor to Gottlieb Gühring, Ebingen, Wurttemberg, Germany
Filed May 26, 1964, Ser. No. 370,241
Claims priority, application Germany, June 14, 1963, G 37,963
17 Claims. (Cl. 51—95)

This invention relates to a machine for grinding the flutes and the relief of twist drills by means of two grinding wheels, one of which grinds flutes having a tapered core whereas the other wheel grinds the relief. The previously known machines of this kind have a very high structural expenditure and lower the workpiece carrier from the grinding wheel during the feed movement of the headstock carrying the grinding wheel spindle. This results in the desired taper of the core. It is difficult to grind the relief at the same time. For this purpose, profiled grinding wheels must be used and these grinding wheels must be controlled. Hence, the grinding operation is complicated and time-consuming and satisfactory results are not obtained.

It is an object of the invention to provide a machine which enables a grinding of the flutes and the relief without need for rechucking the blanks from one working station to another and which results in a relief which is formed exactly in accordance with a cylinder and in flutes having a tapered core.

An essential feature of the machine according to the invention resides in that a turret for carrying the workpieces is mounted on a turret spindle, which is mounted in a headstock, and this turret carries at least two workpiece spindles, each of which is successively used in the grinding of the flutes having a tapered core, and in the grinding of the relief, whereas both kinds of grinding operations are adapted to be carried out at the same time.

Another essential feature of the invention resides in that two carriers are provided for the two grinding wheel spindles, and the carrier for the relief grinding wheel spindle remains at a fixed distance from the workpiece during the grinding operation whereas the carrier for the flute grinding wheel spindle is displaceable approximately at right angles to the axis of movement of the workpiece and in dependence on the feeding of the workpiece so that the tapered core is obtained.

In order to incorporate the loading and unloading of the turret also in the grinding cycle, the turret head may be provided, according to a further feature of the invention, with a third spindle for use in the loading and unloading operation.

Flute grinding and relief grinding and, if desired, loading and unloading being carried out at the same time, the turret spindle is provided according to the invention with an indexing device, which is indexed in steps of 180° or 120°, respectively, and is mechanically operable by a differential gearing or hydraulically operable by rotary pistons.

In a preferred embodiment of the invention, the flute grinding wheel spindle is eccentrically mounted in a sleeve, which is rotatable by a gearing, which is adapted to be controlled by the feed movement of the headstock, and this sleeve is provided with an arm, to which a Bowden cable mounted in ball bearings is connected, and the other end of this Bowden cable, which may incorporate a hydraulic unit, is provided with a roller or the like, which is controlled by a cam or the like connected to the headstock.

In another embodiment of the invention, the carrier for the flute grinding wheel spindle may be mounted in a carriage, which is adapted to be displaced, in a direction transverse to the movement of the headstock, by a motor which is electrically, hydraulically, or mechanically controlled in dependence on the feed movement of the headstock.

Several embodiments of the invention are shown by way of example on the accompanying drawings, in which
FIG. 1 is a diagrammatic front elevation showing a grinding machine according to the invention,
FIG. 2 shows in detail view a modification of FIG. 1,
FIG. 3 shows in detail another modification of FIG. 1,
FIG. 4 shows in detail a further modification of FIG. 1,
FIG. 5 is a diagrammatic front elevation showing a grinding machine according to aother embodiment of the invention,
FIG. 6 shows in detail a modification of FIG. 5,
FIG. 7 shows in detail another modification of the part shown in FIG. 6,
FIG. 8 is a diagrammatic front elevation showing a grinding machine according to a third embodiment of the invention,
FIG. 9 shows in detail a modification of FIG. 8,
FIG. 10 is a sectional view of an indexing device for rotating the turret having three workpiece spindles, and
FIG. 11 is a sectional view taken on line XI—XI of FIG. 10 in a different position of the camwheel.

Referring to FIG. 1, the table of a grinding machine 1 is provided with a horizontal guide 2 for a headstock 3, in which a turret spindle 5 is mounted. This spindle is driven by a differential gearing 4 interposed between two coaxial sections of the spindle. A screw 6 for feeding and retracting the headstock 3 is mounted below the guide 2. The turret spindle 5 and the screw 6 are driven in known manner by a clutch and geared transmissions.

At its end protruding on the operating side, the turret spindle 5 has rotatably mounted on it a quill 5', which carries a turret 7 which, in the embodiment of FIG. 1, has two workpiece spindles 8 and 9. In known manner, each workpiece spindle has a controlled clamping chuck for gripping the workpieces 10 and 11. As is also known, the workpiece spindles are driven from the turret spindle 5 by means of a geared transmission 12.

The machine is provided with two carriers for grinding wheel spindles. The grinding wheel spindle carrier 13 consists of a carriage, which is movable in a guide extending at right angles to the turret spindle 5. A grinding wheel spindle 14 extending parallel to the turret spindle 5 is mounted in the carriage 13 and carries a grinding wheel 14', which serves for grinding the relief of the workpiece. The grinding wheel spindle carrier 15 consists of a carriage, which moves in a guide 16, which is formed of the machine frame. This guide extends also at right angles to the turret spindle 5 and is preferably vertical. The carrier 15 may be set at an angle to the turret spindle 5 to provide for the desired twist of the drill. In a sleeve 19 mounted in the carrier 15, a grinding wheel spindle 17 is eccentrically disposed. A grinding wheel 18 carried at the end of this spindle serves for grinding the flutes.

The sleeve 19 is provided with a lever 20, which is connected to the end of a Bowden cable 21 mounted in ball bearings. This Bowden cable may incorporate a hydraulic control unit for a rapid withdrawal and has at its other end a roller 23, which cooperates with a guide 24, which can be adjusted to an oblique angle. The guide is pivoted to the headstock 3. The guide may be curved and its inclination may be adjusted by a geared transmission 25.

When both workpiece spindles 8 and 9 have been loaded with a workpiece consisting of a twist drill blank to be ground, and when the headstock 3 feeds the twist drill blanks past the properly adjusted grinding wheels, the guide 24 will effect by means of the Bowden cable 21 a rotation of the sleeve 19 so that the grinding wheel spindle 17 is lifted and a tapered core is ground. The grinding wheel 14' grinds the relief at the same time.

When the headstock has been automatically retracted by means which are not shown, the grinding wheel 18 will again be in its initial position. Before the next operation, the workpiece spindles 8 and 9 are rotated through 180° under the control of the differential gearing 4. The completely ground workpiece is removed and replaced by a blank. In this way, the grinding of one workpiece is completed in each cycle.

FIG. 2 shows an indexing device having a hydraulically operated, rotary piston 26. The rotary piston 26 is connected to one section of the turret spindle 5 and the piston housing is connected to the other section of the turret spindle 5.

FIG. 3 shows another embodiment of the means for controlling the sleeve 19, in which the spindle 17 is eccentrically mounted. The lever 20 of the sleeve 19 is connected by a link 27 to one end of a two-armed lever 28, which is pivoted to the horizontal guide 2. The other end of the lever 28 carries a roller 29, which contacts the guide 24. A hydraulic unit 30 serves for a quick withdrawal of the lever 28.

In the embodiment of FIG. 4, the guide 24 is replaced by a camwheel 31, which is rotated by the headstock 3 by a pinion 32 and a rack 33.

The machine which is diagrammatically shown in FIG. 5 corresponds substantially to the machine of FIG. 1 with the difference that the carriage 15, which carries the grinding wheel spindle 17, is directly controlled by a horizontal cam 34, which is operable by a geared transmission. The carriage 15 is provided with a hydraulic unit 35 for a rapid withdrawal of the grinding wheel 18 during the retraction of the headstock.

The horizontal cam is replaced in the embodiment of FIG. 6 by a control cam 36 and in the embodiment of FIG. 7 by a wedge-shaped guide 37.

The machine which is diagrammatically shown in FIG. 8 corresponds substantially to the machine of FIG. 1, with the difference that the carriage 15 which carries the grinding wheel spindle 17 is adjusted by a screw 39, which is adapted to be driven by an adjusting motor 38. The motor 38 is controlled by a switch 40, which is controlled in turn by a cam 41 carried by the headstock 3. It is obvious that the guide 41 may be replaced by the cam means which have been described hereinbefore.

In the embodiment of FIG. 9, the adjusting motor 42 is a hydraulic turbine adapted to be driven by pressure fluid supplied through a conduit 43, which incorporates a spring-loaded valve 44, which is controlled by the inclined guide 41.

If the cycle is to be utilized also for loading and unloading the turret, the turret will be provided with three workpiece spindles, one of which is used in grinding the flutes, the second in grinding the lands, and the third in the loading operation. The machine must then be provided with a workpiece feeder, which feeds the individual workpieces from a supply container into the path of the loading spindle when the completely ground workpiece has been ejected. The means required for this purpose are known in automatic machines of this type and need not be explained.

Where an automatic loading and unloading are not provided for, the machine is semi-automatic, the loading of the free workpiece spindle being carried out by hand.

The following description will set forth the device according to the invention which serves for rotating the turret through the required angle after each replacement of a workpiece. This angle 180° with a turret having two workpiece spindles and 120° with a turret having three workpiece spindles, and will be correspondingly smaller with a turret having more than three workpiece spindles.

The device illustrated in FIGS. 10 and 11 has the reference character T in FIGS. 1, 5, and 8. A hydraulically operable piston 45 constituting a rack 46 is mounted in the headstock 3. The rack 46 is in mesh with a pinion 47, which is keyed to a hub 48 of a camwheel 49. The hub 48 is rotatably mounted on the quill 5', which carries the turret. An indexing disc 50 is keyed to the quill 5' and provided with a suitable number of indentations 51, which are associated with a detent tooth 53, which is displaceably mounted in a sleeve 52 and under the pressure of a spring 54. The detent tooth 53 contains a pin 55, which carries a rotary bearing for a pivoted finger 56, which is urged by a spring 57 toward a one-way stop 58. The hinged finger 56 is adjacent to the camwheel 49, which carries a spring-loaded pawl 59.

The piston 45 is controlled by automatic means, known per se, as soon as an angular movement of the turret is required. A displacement of the piston 45 to the right from the position of FIG. 10 will cause a rotation of the pinion 47 and of the camwheel 49, which is fixed to the pinion 47, in a counterclockwise sense. During this rotation the cam portion 60 lifts the pivoted finger 56 so that the detent tooth 53 gets out of the respective indentation 51. Immediately after the pawl 59 has entered the next indentation during the further rotation, the cam wheel 49 drives the indexing disc 50 and with it the quill. During the further rotation of the camwheel 49, the pivoted finger 56 enters the range of the cam portion 61 so that the detent tooth 53 can enter under the action of the spring 54 the indentation 51 moving into registry. Thus, the indexing disc and the quill 5' carrying the turret are fixed in the new position. The piston 45 is now moved back by the automatic control means to the position shown in FIG. 10. During the reverse rotation of the camwheel 49, the pivoted finger 56 may be swung away so that the camwheel 49 can move back to the position illustrated in FIG. 10.

What is claimed is:

1. A grinding machine which comprises a headstock, a turret spindle mounted in said headstock, a turret rotatably mounted on said turret spindle, at least two workpiece spindles mounted in regularly angularly spaced positions on said turret, two grinding wheel spindles disposed adjacent to the orbit of said workpiece spindles and spaced apart by the same angle as said workpiece spindles, each of said workpiece spindles being adapted to carry a workpiece, each of said grinding wheel spindles being adapted to carry a grinding wheel intersecting the orbit of said workpieces on said workpiece spindles, and locating means adapted to hold said turret in various positions which are spaced apart by the same angle as said workpiece spindles and in which each of said grinding wheel spindles is at a grinding distance from one of said workpiece spindles in the radial direction of said turret spindle, said workpiece spindles being adapted to carry twist drill blanks and said headstock being movable in the axial direction of said turret spindle relative to said grinding wheel spindles, and which comprises means including one of said grinding wheel spindles for grinding flutes having a tapered core in said blanks, and means comprising the other of said grinding wheel spindles for grinding a relief on said blanks.

2. A grinding machine as set forth in claim 1, which comprises first and second carriers which carry said two grinding wheel spindles, respectively, means for holding said first carrier against a radial movement with respect to said turret spindle, and means for adjusting the radial distance of said second carrier from said turret spindle in response to an axial movement of said headstock to grind flutes having a tapered core.

3. A grinding machine which comprises a headstock, a turret spindle mounted in said headstock, a turret rotatably mounted on said turret spindle, at least two workpiece spindles mounted in regularly angularly spaced positions on said turret, two grinding wheel spindles disposed adjacent to the orbit of said workpiece spindles and spaced apart by the same angle as said workpiece spindles, each of said workpiece spindles being adapted to carry a workpiece, each of said grinding wheel spindles being adapted to carry a grinding wheel intersecting the orbit of said workpieces on said workpiece spindles, and locating means adapted to hold said turret in various positions which are spaced apart by the same angle as said workpiece spindles and in which each of said grinding wheel spindles is at a grinding distance from one of said workpiece spindles in the radial direction of said turret spindle, further comprising first and second carriers which carry said two grinding wheel spindles, respectively, means for holding said first carrier against a radial movement with respect to said turret spindle, and means for adjusting the radial distance of said second carrier from said turret spindle.

4. A grinding machine which comprises a headstock, a turret spindle mounted in said headstock, a turret rotatably mounted on said turret spindle, at least two workpiece spindles mounted in regularly angularly spaced positions on said turret, two grinding wheel spindles disposed adjacent to the orbit of said workpiece spindles and spaced apart by the same angle as said workpiece spindles, each of said workpiece spindles being adapted to carry a workpiece, each of said grinding wheel spindles being adapted to carry a grinding wheel intersecting the orbit of said workpieces on said workpiece spindles, and locating means adapted to hold said turret in various positions which are spaced apart by the same angle as said workpiece spindles and in which each of said grinding wheel spindles is at a grinding distance from one of said workpiece spindles in the radial direction of said turret spindle, said headstock being movable in the axial direction of said turret spindle and one of said grinding wheel spindles being eccentrically mounted in a rotatable sleeve, said machine comprising means for rotating said sleeve in dependence on the axial movement of said headstock.

5. A machine as set forth in claim 4, which comprises an arm non-rotatably connected to said sleeve, Bowden cable means mounted in ball bearings and connected to said arm, a follower connected to said Bowden cable means, and cam means arranged to move in unison with said headstock and engageable with said follower.

6. A machine as set forth in claim 5, in which said Bowden cable means incorporate a hydraulic unit.

7. A machine as set forth in claim 5, in which said follower comprises a roller.

8. A grinding machine which comprises a headstock, a turret spindle mounted in said headstock, a turret rotatably mounted on said turret spindle, at least two workpiece spindles mounted in regularly angularly spaced positions on said turret, two grinding wheel spindles disposed adjacent to the orbit of said workpiece spindles and spaced apart by the same angle as said workpiece spindles, each of said workpiece spindles being adapted to carry a workpiece, each of said grinding wheel spindles being adapted to carry a grinding wheel intersecting the orbit of said workpieces on said workpiece spindles, and locating means adapted to hold said turret in various positions which are spaced apart by the same angle as said workpiece spindles and in which each of said grinding wheel spindles is at a grinding distance from one of said workpiece spindles in the radial direction of said turret spindle, said headstock being movable in the axial direction of said turret spindle and one of said grinding wheel spindles being rotatably mounted in a carriage, which is radially movable with respect to said turret spindle, said machine comprising motor means for radially moving said carriage with respect to said turret spindle.

9. A machine as set forth in claim 8, which comprises electric control means for controlling said motor in dependence on said axial movement of said headstock.

10. A machine as set forth in claim 8, which comprises hydraulic control means for controlling said motor in dependence on said axial movement of said headstock.

11. A machine as set forth in claim 8, which comprises mechanical control means for controlling said motor in dependence on said axial movement of said headstock.

12. A grinding machine which comprises a headstock, a turret spindle mounted in said headstock, a turret rotatably mounted on said turret spindle, at least two workpiece spindles mounted in regularly angularly spaced positions on said turret, two grinding wheel spindles disposed adjacent to the orbit of said workpiece spindles and spaced apart by the same angle as said workpiece spindles, each of said workpiece spindles being adapted to carry a workpiece, each of said grinding wheel spindles being adapted to carry a grinding wheel intersecting the orbit of said workpieces on said workpieces spindles, and locating means adapted to hold said turret in various positions which are spaced apart by the same angle as said workpiece spindles and in which each of said grinding wheel spindles is at a grinding distance from one of said workpiece spindles in the radial direction of said turret spindle, further comprising a quill surrounding said turret spindle and carrying said turret, and said locating means comprising an indexing disc carried by said quill, a plurality of indentations formed in the periphery of said disc at positions spaced apart by the same angle as said workpiece spindles, a detent tooth non-rotatably mounted adjacent to the periphery of said disc and radially movable with respect to said disc, and a camwheel cooperating with said tooth to control the radial position thereof so that said tooth is engaged with and disengaged from said indentations.

13. A machine as set forth in claim 12, in which said camwheel and indexing disc are coaxial and said camwheel is provided with a claw which is arranged to couple said camwheel to said disc after said tooth has been disengaged from one of said indentations, said camwheel being operable to rotate said disc and turret when said camwheel is coupled to said disc by said claw until the next indentation is in registry with said tooth.

14. A machine tool which comprises a headstock, a turret spindle mounted in said headstock, said headstock being movable in the axial direction of said turret spindle, a turret rotatably mounted on said turret spindle, at least two workpiece spindles mounted in regularly angularly spaced positions on said turret, first and second tool carriers disposed adjacent to the orbit of said workpiece spindles and spaced apart substantially by the same angle as said workpiece spindles, each of said workpiece spindles being adapted to carry a workpiece, each of said tool carriers being adapted to carry a tool intersecting the orbit of said workpieces on said workpiece, spindles, locating means adapted to hold said turret in a plurality of positions which are spaced apart by the same angle as said workpiece spindles and in which each of said tool carriers is at a machining distance from one of said workpiece spindles in the radial direction of said turret spindle, and means for adjusting the radial distance of one of said carriers from said turret spindle in response to an axial movement of said headstock.

15. In a machine tool, a taper attachment which comprises a first carrier displaceable along a first predetermined path, a second carrier adjustable along a second predetermined path which is transverse to said first path, a sleeve which is rotatable to adjust said second carrier along said second path, and Bowden cable means operatively connected to said first carrier and said sleeve and arranged to rotate said sleeve in response to a displacement of said first carrier along said first path, said Bowden cable means incorporating a series-connected, hydraulically operable unit, one of said carriers being adapted to carry a workpiece, the other of said carriers being adapted to carry a tool, said first and second carriers being displaceable along said first and second paths, respectively, to relative positions in which said carriers are at a machining distance from each other.

16. A taper attachment which comprises a first carrier displaceable along a first predetermined path, a second carrier adjustable along a second predetermined path which is transverse to said first path, a sleeve which is rotatable to adjust said second carrier along said second path, and Bowden cable means operatively connected to said first carrier and said sleeve and arranged to rotate said sleeve in response to a displacement of said first carrier along said first path, said Bowden cable means incorporating a series-connected, hydraulically operable unit, one of said carriers being adapted to carry a workpiece, the other of said carriers being adapted to carry a tool, said first and second carriers being displaceable along said first and second paths, respectively, to relative positions in which said carriers are at a machining distance from each other.

17. A taper attachment as set forth in claim 16, which comprises a cam connected to said first carrier and a cam follower connected to said Bowden cable means and engaging said cam for operating said Bowden cable means in response to a displacement of said first carrier along said first path.

References Cited by the Examiner

UNITED STATES PATENTS

| | | | |
|---|---|---|---|
| 1,020,946 | 3/1912 | Dosch | 51—108 |
| 1,708,569 | 4/1929 | Frotheringham | 51—108 X |
| 1,976,818 | 10/1934 | Ward | 51—216 X |
| 2,597,648 | 5/1952 | Lucas | 51—95 X |
| 2,914,888 | 12/1959 | McDougal et al. | 51—108 X |

LESTER M. SWINGLE, *Primary Examiner.*